United States Patent
Ramanathan et al.

(10) Patent No.: US 11,637,769 B2
(45) Date of Patent: Apr. 25, 2023

(54) AUTOMATIC APPLICATION-BASED MULTIPATH ROUTING FOR AN SD-WAN SERVICE

(71) Applicant: Juniper Networks, Inc., Sunnyvale, CA (US)

(72) Inventors: Sai Prashanth Ramanathan, Bangalore (IN); Hemachandran Karnam Mohan, Chittoor (IN); Abdul Kadhar Jeelany Habeeb Mohamed, Chennai (IN); Antony Alexis, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 17/473,561

(22) Filed: Sep. 13, 2021

(65) Prior Publication Data

US 2023/0080537 A1 Mar. 16, 2023

(51) Int. Cl.
*H04L 45/302* (2022.01)
*H04L 45/02* (2022.01)
*H04L 45/42* (2022.01)
*H04L 45/24* (2022.01)

(52) U.S. Cl.
CPC ............ *H04L 45/302* (2013.01); *H04L 45/02* (2013.01); *H04L 45/24* (2013.01); *H04L 45/42* (2013.01)

(58) Field of Classification Search
CPC ....... H04L 45/302; H04L 45/02; H04L 45/24; H04L 45/42
See application file for complete search history.

(56) References Cited

U.S. PATENT DOCUMENTS 11,108,651 B1 * 8/2021 Mermoud ............... H04L 45/22
11,381,474 B1 * 7/2022 Kumar ................ H04L 41/0896
(Continued)

FOREIGN PATENT DOCUMENTS

EP 3654589 A1 5/2020

OTHER PUBLICATIONS

Venkatesh, K., et al. "QoS improvisation of delay sensitive communication using SDN based multipath routing for medical applications." Future Generation Computer Systems 93 (2019): 256-265.*

(Continued)

*Primary Examiner* — Jimmy H Tran
(74) *Attorney, Agent, or Firm* — Shumaker & Sieffert, P.A.

(57) ABSTRACT

Example network devices, systems, and methods are disclosed. In an example, a network device includes memory configured to store information associated with one or more service level agreements (SLAs) for applications in a software-defined wide area network (SD-WAN) and an application-based multipath routing (AMR) module including processing circuitry. The AMR module is configured to identify, based on criteria, one or more of the applications for AMR, wherein each criterion of the criteria is associated with a corresponding property of an application. The AMR module is configured to determine a breach of one of the SLAs on each WAN link associated with a first application of the identified one or more applications. The AMR module is configured to apply, in response to determining the breach, AMR for the first application.

20 Claims, 6 Drawing Sheets

(56) References Cited

U.S. PATENT DOCUMENTS

| | | | |
|---|---|---|---|
| 2004/0037231 A1* | 2/2004 | Heiner | H04L 41/0896 370/252 |
| 2007/0140128 A1* | 6/2007 | Klinker | H04L 45/38 370/252 |
| 2011/0149963 A1* | 6/2011 | Hamilton | H04L 47/125 370/392 |
| 2011/0292933 A1* | 12/2011 | Rodriguez Perez | H04L 45/586 370/389 |
| 2013/0132561 A1* | 5/2013 | Pasala | H04L 67/1097 709/224 |
| 2013/0159479 A1* | 6/2013 | Vasseur | H04L 49/205 709/221 |
| 2013/0275589 A1* | 10/2013 | Karthikeyan | H04L 47/127 709/224 |
| 2015/0043384 A1* | 2/2015 | Hui | H04L 45/125 370/255 |
| 2015/0063365 A1* | 3/2015 | Hui | H04L 47/628 370/408 |
| 2015/0207760 A1* | 7/2015 | Raleigh | H04W 8/04 709/225 |
| 2015/0295856 A1* | 10/2015 | Karthikeyan | H04L 47/726 370/230 |
| 2015/0333953 A1* | 11/2015 | Vasseur | H04L 45/22 370/228 |
| 2016/0119250 A1* | 4/2016 | Girard | H04L 67/56 709/226 |
| 2017/0099211 A1* | 4/2017 | Iovanna | H04L 41/5019 |
| 2019/0036814 A1* | 1/2019 | Aranha | H04L 45/64 |
| 2019/0130327 A1* | 5/2019 | Carpenter | G06F 9/45558 |
| 2019/0140937 A1* | 5/2019 | Kumar | H04L 45/127 |
| 2019/0317749 A1* | 10/2019 | Hu | H04L 45/02 |
| 2020/0106683 A1* | 4/2020 | Biran | H04L 43/091 |
| 2020/0106699 A1* | 4/2020 | Chauhan | H04L 69/14 |
| 2020/0296011 A1 | 9/2020 | Jain et al. | |
| 2020/0358668 A1* | 11/2020 | Kumaran | H04L 43/0817 |
| 2020/0366616 A1* | 11/2020 | Chunduru Venkata | H04L 41/40 |
| 2020/0382402 A1* | 12/2020 | Kolar | H04L 43/12 |
| 2021/0029019 A1* | 1/2021 | Kottapalli | H04L 45/22 |
| 2021/0083948 A1* | 3/2021 | Paruchuri | H04L 45/24 |
| 2021/0092062 A1* | 3/2021 | Dhanabalan | H04L 47/805 |
| 2021/0112017 A1* | 4/2021 | Gupta | H04L 45/24 |
| 2021/0135978 A1* | 5/2021 | Nemirovsky | H04L 45/121 |
| 2021/0160897 A1* | 5/2021 | Young | H04W 72/1257 |
| 2021/0320850 A1* | 10/2021 | Young | H04L 41/5012 |
| 2022/0052905 A1* | 2/2022 | Vasseur | H04L 41/14 |
| 2022/0060393 A1* | 2/2022 | Vasseur | H04L 45/30 |
| 2022/0070086 A1* | 3/2022 | Mermoud | H04L 41/147 |
| 2022/0141139 A1* | 5/2022 | Wong | H04L 41/5003 709/223 |
| 2022/0231939 A1* | 7/2022 | Mermoud | H04L 45/22 |
| 2022/0245647 A1* | 8/2022 | Dhawan | G06Q 30/0281 |
| 2022/0337553 A1* | 10/2022 | Mayya | H04L 49/35 |

OTHER PUBLICATIONS

Wu, Jie, and Yunsheng Wang. "Social feature-based multi-path routing in delay tolerant networks." 2012 Proceedings IEEE INFOCOM. IEEE, 2012.*

Javed, Umar, et al. "Multipath protocol for delay-sensitive traffic." 2009 First International Communication Systems and Networks and Workshops. IEEE, 2009.*

Extended Search Report from counterpart European Application No. 22195211.2 dated Dec. 21, 2022, 13 pp.

* cited by examiner

| APPLICATIONS | RTP | OFFICE | < 256 BYTES | BANKING/TRADING | STREAMING | DSCP | AMR MODULE IDENTIFIED FOR AMR | AMR MODULE WEIGHT | AMR MODULE PRIORITY |
|---|---|---|---|---|---|---|---|---|---|
| WEIGHTS | 4 | 5 | 8 | 9 | 8 | 10 | | | |
| FIRST VIDEO MEETING | X | X | X | | X | | X | 25 | 1 |
| SECOND VIDEO MEETING | X | X | | | X | | X | 17 | 2 |
| EMAIL | | X | | | | | X | 5 | 3 |
| STOCK | | | X | X | | | X | 17 | 2 |
| BANK | | | X | X | | | X | 17 | 2 |
| EDUCATION | | X | | | | | X | 5 | 3 |
| VIDEO | | | | | | | NO MATCHES | 0 | 0 |
| FTP | | | | | | | NO MATCHES | 0 | 0 |

FIG. 3

| APPLICATIONS | AMR MODULE IDENTIFIED FOR AMR | AMR MODULE PRIORITY | SLA VIOLATED WAN LINK 1 | SLA VIOLATED WAN LINK 2 | AMR APPLIED |
|---|---|---|---|---|---|
| FIRST VIDEO MEETING | X | 1 | X | X | X |
| SECOND VIDEO MEETING | X | 2 | X | | |
| EMAIL | X | 3 | X | | |
| STOCK | X | 2 | | X | |
| BANK | X | 2 | X | | |
| EDUCATION | X | 3 | | X | |
| VIDEO | NO MATCHES | 0 | | | |
| FTP | NO MATCHES | 0 | | | |

FIG. 4

AUTOMATIC APPLICATION-BASED MULTIPATH ROUTING FOR AN SD-WAN SERVICE

TECHNICAL FIELD

The disclosure relates to computer networks.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and enterprises may use software-defined networking in a wide area network (SD-WAN) to manage network connectivity among distributed locations, such as remote branch or central offices or data centers. SD-WAN extends SDN to enable businesses to create connections quickly and efficiently over the WAN, which may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

An SD-WAN service enables users, such as enterprises, to use the WAN links to meet business and customer needs. In an SD-WAN environment, low-priority traffic can use the lower-cost Internet-based WAN link(s), while more important traffic can travel across better quality WAN links (such as those provided by an MPLS network). WAN link usage can also be assigned per application. With an SD-WAN solution, an enterprise customer can mix and match cost optimization with service level agreement (SLA) requirements as they see fit. Users may expect their applications to experience connectivity having an acceptable level of quality, commonly referred to as Quality of Experience (QoE). The QoE may be measured based on various performance metrics of a link, including latency, delay (inter frame gap), jitter, packet loss, and/or throughput (e.g., bandwidth). The user may define desired levels for one or more of the metrics for the QoE that the users expect in service contracts, e.g., SLAs, with the service provider. SLA metrics are typically user configurable values and are derived through trial-and-error methodologies or benchmark test environment versus user experience or realistic best application metrics.

SUMMARY

In general, the disclosure describes techniques for automatically identifying which applications should have application-based multipath routing (AMR) applied when delivering application traffic across an SD-WAN and applying AMR to the identified applications upon the occurrence of one or more conditions. A network device, according to the techniques of this disclosure, may apply AMR to an identified application even if AMR has not been previously provisioned (pre-provisioned) for the identified application.

For example, a network device may use criteria which may be associated with a corresponding property of an application. In some examples, each criterion of the criteria may have a corresponding weighting. These criteria may be predetermined by, for example, a network device manufacturer, or may be configured by a network operator, administrator, or customer of an SD-WAN service. In some examples, the criteria and/or the weightings of the criteria may be dynamically and automatically adapted based on network conditions and/or the SD-WAN deployment, such that the criteria and/or weights can be changed without operator input. The network device may identify which applications should be eligible for application of AMR based on the criteria. Then, when a breach of a service level agreement (SLA) of each WAN link associated with an application that is eligible for application of AMR occurs, the network device may apply AMR even if the AMR has not been previously provisioned for the application. For example, the network device may apply AMR for the application by creating copies of application packets and transmitting copies of the application packets through two or more WAN links.

Manually determining which applications should be provisioned for AMR and provisioning such applications is a complex and tedious process as thousands of applications may be providing traffic on a network. If AMR is pre-provisioned for some applications and a new application for which QoE is important is added to the network, without AMR being pre-provisioned for the new application, the QoE of the new application will suffer if the SLA is not met on all WAN links associated with the new application. By automatically identifying which applications should be eligible candidates for AMR and applying AMR to such applications even when the AMR has not been pre-provisioned for such applications, network devices may save network administrators countless hours of analyzing applications to determine which applications should be provisioned for AMR, while also reducing the impact on QoE when SLAs are breached. In this way, the example techniques provide a technical solution to a technical problem related to determining which applications should be enabled for AMR and applying AMR to such applications even if AMR was not pre-provisioned for the applications, and incorporate the techniques into a practical application for identifying applications and applying AMR to such applications.

In an example, a network device includes memory configured to store information associated with one or more service level agreements (SLAs) for applications in a software-defined wide area network (SD-WAN) and an application-based multipath routing (AMR) module comprising processing circuitry, the AMR module being configured to: identify, based on criteria, one or more of the applications for AMR, wherein each criterion of the criteria is associated with a corresponding property of an application; determine a breach of one of the SLAs on each WAN link associated with a first application of the identified one or more applications; and apply, in response to determining the breach, AMR for the first application.

In an example, a method includes: identifying, by processing circuitry and based on criteria, one or more applications for application-based multipath routing (AMR) in a software-defined wide area network (SD-WAN), wherein each criterion of the criteria is associated with a corresponding property of an application; determining, by the processing circuitry, a breach of a service level agreement (SLA) for a first application of the identified one or more applications on each WAN link associated with the first application; applying, by the processing circuitry and in response to determining the breach, AMR for the first application.

In an example, a non-transitory computer-readable storage medium includes instructions, which, when executed, cause processing circuitry to: identify, based on criteria, one or more applications for application-based multipath routing (AMR) in a software-defined wide area network (SD-WAN), wherein each criterion of the criteria is associated with a corresponding property of an application; determine a breach of a service level agreement (SLA) for a first application of the identified one or more applications on each WAN link associated with the first application; and apply, in response to determining the breach, AMR for the first application.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a tabular diagram illustrating an example prioritization of applications.

FIG. 4 is a tabular diagram illustrating an example of when AMR is applied.

Like reference characters refer to like elements throughout the text and figures.

DETAILED DESCRIPTION

Figure 1:
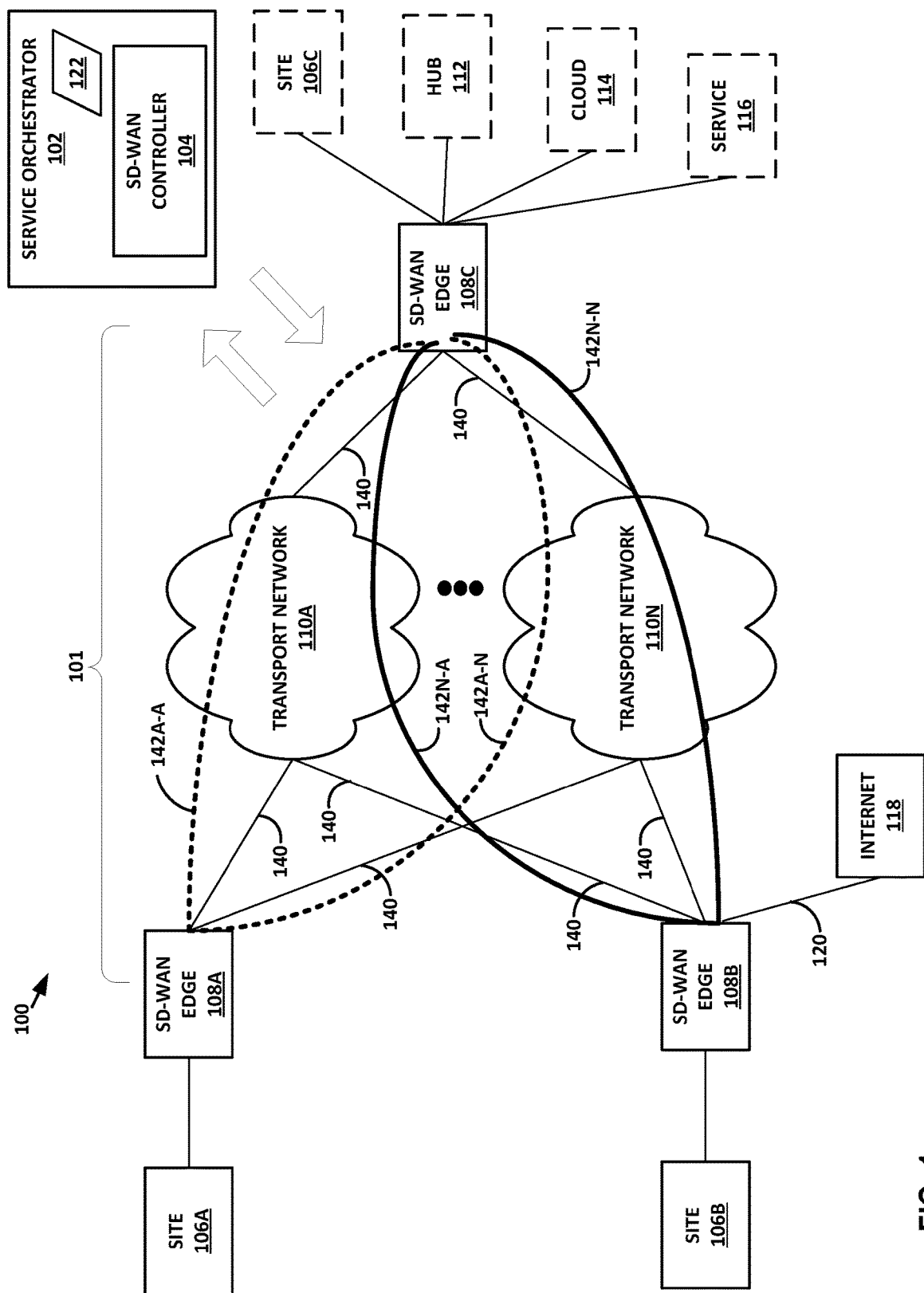
FIG. 1 is a block diagram illustrating an example software-defined wide area network (SD-WAN) system implemented in a network, in accordance with the techniques of this disclosure.

FIG. 1 is a block diagram illustrating an example software-defined wide area network (SD-WAN) system implemented in a network, in accordance with the techniques of this disclosure. SD-WAN system 100 includes transport networks 110A-110N (collectively, "transport networks 110") for connecting sites attached to transport networks and for transporting network traffic between such attached sites. One or more service providers may deploy transport networks 110, which may therefore alternatively be referred to as "service provider networks." Sites attached to service provider networks may be referred to as "subscriber sites." As used herein, the terms "subscriber," "customer," and "tenant" may be used interchangeably. SD-WAN system 100 may be configured to implement techniques disclosed herein to identify applications for AMR eligibility and the apply AMR to such applications.

A service provider uses SD-WAN system 100 to offer an SD-WAN service 101 to its subscribers or organizations authorized by such subscribers, which may include cloud providers, cloud networks, and subscriber partners for instance. SD-WAN service 101 provides a virtual overlay network that enables application-aware, orchestrated connectivity to deliver IP packets between sites associated with a subscriber according to policies. The service provider may offer multiple SD-WAN services.

SD-WAN system 100 includes service orchestrator 102, SD-WAN controller 104, and multiple SD-WAN edge devices 108A-108C (hereinafter, "SD-WAN edges" and collectively, "SD-WAN edges 108") that implement SD-WAN service 101. SD-WAN edges 108 are connected to one another by transport networks 110. Control and ownership of service orchestrator 102, SD-WAN controller 104, SD-WAN edges 108, and transport networks 110 may be distributed among one or more service providers, subscribers, enterprises, or other organizations. However, the SD-WAN service provider uses all of these components to provide the SD-WAN service 101. The SD-WAN service provider may be an enterprise, network/Internet service provider, cloud provider, or other entity.

In general, service orchestrator 102 manages SD-WAN services. Service orchestrator 102 may control, fulfill, configure, monitor usage, assure, analyze, secure, modify, reconfigure, and apply policies to SD-WAN services. Service orchestrator 102 may establish application-based forwarding over transport networks 110 based on security policies, Quality of Service (QoS) policies, QoE policies, and/or business or intent-based policies. Service orchestrator 102 may contain or represent a Network Service Orchestrator (NSO). Service orchestrator 102 has awareness of resources of SD-WAN system 100 and may enable, for example: tenant site and service management; end-to-end traffic orchestration, visibility, and monitoring; physical network function (PNF) and/or virtual network function (VNF) management; policy and SLA management (PSLAM) to enable SD-WAN functions; routing management for managing routing operations including creating virtual private networks, enabling routing on SD-WAN edges 108, and interfacing to route reflectors and routers; telemetry services that provide interfaces used by fault monitoring and performing monitoring systems for collecting service check results from telemetry agents; and network activation functions to enable device provisioning. At least some of the above functions may be performed by components of a separate or integrated SD-WAN controller 104.

SD-WAN controller 104 may contain or represent a Network Service Controller (NSC). In general, service orchestrator 102 interacts with SD-WAN controller 104 to manage SD-WAN edges 108 to create and operate end-to-end SD-WAN managed services between SD-WAN edges 108 over transport networks 110. SD-WAN controller 104 may provide topology and SD-WAN edge 108 lifecycle management functionality. For example, SD-WAN controller 104 provides PNF/VNF management for SD-WAN edges 108 managed by service orchestrator 102. For example, SD-WAN controller 104 may configure the network configurations of SD-WAN edges 108, configure policies on SD-WAN edges 108, and so forth. SD-WAN controller 104 may monitor statuses and performance data for SD-WAN edges 108 and WAN links 142A-A-142N-N (collectively, "WAN links 142") and provide this information to the service orchestrator 102. In other words, SD-WAN controller 104 may communicate with SD-WAN edges 108 to determine the operational state of WAN links 142 across transport networks 110 and to obtain QoS/QoE performance metrics for WAN links 142. As described in further detail, SD-WAN system 100 may, based on the performance metrics for the WAN links, modify traffic patterns to better meet SLA demands for SD-WAN services in SD-WAN system 100.

In various examples of SD-WAN system 100, service orchestrator 102 and SD-WAN controller 104 may, for example, be combined to form a single service orchestration platform having separate service orchestration and domain orchestration layers, deployed as separate devices or appliances, or each may be distributed among one or more components executing on one or more servers deployed in one or more locations. Service orchestrator 102 may be a scalable and cloud deployable platform. For example, the service provider for SD-WAN services in SD-WAN system 100 may deploy service orchestrator 102 to a provider site or to a public, private, or hybrid cloud. As such, operations and functions attributed in this disclosure to service orchestrator 102 may be performed by a separate SD-WAN controller 104, and vice-versa. Aspects of service orchestration and SD-WAN control may also be distributed from service orchestrator 102 and SD-WAN controller 104, respectively, among SD-WAN edges 108 in some example architectures.

Administrators and applications may interface with service orchestrator 102 using northbound interfaces such as RESTful interfaces (e.g., web-based REST APIs), command-line interfaces, portal or graphical user interfaces, web-based user interface, or other interfaces of service orchestrator 102 (not shown in FIG. 1). Service orchestrator 102 may communicate with SD-WAN controller 104 via a southbound interface, which may be a northbound interface of SD-WAN controller, such as RESTful interfaces, command-line interfaces, graphical user interfaces, or other interfaces of service orchestrator 102 (not shown in FIG. 1).

Network links 140 connect SD-WAN edges 108 to transport networks 110. Network links 140 and transports networks 110 make up the underlay network for the SD-WAN service 101 and offer underlay connections between pairs of SD-WAN edges 108. For example, transport network 110A and transport network 110N offer separate underlay connections (not shown in FIG. 1) between SD-WAN edge 108A and SD-WAN edge 108C. The underlay connection may be public or private and may be a network service offering, such as a label switched path (LSP), an Ethernet service, and IP service, a public Internet service, or other service that enables an overlay WAN link. Costs for usage of an underlay connection may be flat-rate or usage-based. Each underlay connection may have a bandwidth limitation, performance metrics (e.g., latency, loss, jitter, and so forth). SD-WAN service 101 may be deployed using underlay connections based on multiple different types of network service. In the example of FIG. 1, for instance, an underlay connection from SD-WAN edge 108A to SD-WAN edge 108C via transport network 110A may be an LSP for an IP-VPN, while an underlay connection from SD-WAN edge 108A to SD-WAN edge 108C via transport network 110N may be an IPSec tunnel over the Internet. This diversity may be advantageous for an SD-WAN service by facilitating redundancy and by offering differentiated service capabilities to enable matches between cost/performance and application requirements/SLA for different traffic that uses the SD-WAN service. For example, SD-WAN edge 108A may direct low-cost traffic via the Internet while directing traffic for an application that requires low-latency (e.g., Voice-over-IP) via an LSP. An underlay connection may be created and/or managed by the SD-WAN service provider or by the SD-WAN service 101 subscriber that notifies service orchestrator 102 of the underlay connection. Service orchestrator 102 obtains the link data for WAN links 142, including bandwidth limitations for WAN links 142 (if any). Service orchestrator 102 may obtain the link data from SD-WAN controller 104, receive configuration data that has the link data, or obtain the link data from another network controller or from SD-WAN edges 108. WAN links 142 are described and illustrated as bidirectional, but each of WAN links 142 may represent two separate WAN links, one for each direction.

SD-WAN system 100 illustrates multiple sites associated with a subscriber of the SD-WAN service 101 provider and attached to subscriber-facing interfaces of SD-WAN edges 108. These sites may be referred to as subscriber sites, which make up the subscriber network in that SD-WAN service 101 interconnects the multiple sites to form a single network. SD-WAN system 100 in the example of FIG. 1 includes sites 106A-106B and may optionally include any of site 106C, hub 112, cloud 114, or cloud service 116. In some cases, the "subscriber" and the SD-WAN provider are the same entity, as where an enterprise deploys and manages SD-WAN system 100.

Each of sites 106A-106C refers to a subscriber location and may represent, for example, a branch office, private cloud, an on-premises spoke, an enterprise hub, or a cloud spoke. Provider hub 112 represents a multitenant hub device located in a point-of-presence (PoP) on the service provider network. Provider hub 112 may terminate overlay tunnels for overlay networks, which may be of various types such as MPLS over Generic Route Encapsulation (MPLSoGRE) and MPLSoGRE over IPSec (MPLSoGREoIPsec) and MPLS over User Datagram Protocol (MPLSoUDP) tunnels. Provider hub 112 may be the hub in a hub-and-spoke architecture for some example deployments of SD-WAN service 101.

Cloud 114 represents a public, private, or hybrid cloud infrastructure. Cloud 114 may be a virtual private cloud within a public cloud. Cloud service 116 is a resource or higher order service that is offered by a cloud service provider to the subscriber over SD-WAN service 101. Cloud service 116 may be, for instance, Software as a Service (SaaS), Platform as a Service (PaaS), Infrastructure as a Service (IaaS), Storage as a Service, or other type of cloud service. Cloud service 116 may be offered by infrastructure of cloud 114.

Internet 118 represents the web and/or an Internet-connected service offered via the web. SD-WAN edge 108B, in this example, includes an Internet breakout 120 and assigns application flows to Internet breakout 120 by policy.

Each of SD-WAN edges 108 includes a physical network function or virtual network function for implementing SD-WAN service 101. In various examples, each of SD-WAN edges 108 may be, for instance, one or more VNFs or a PNF located within any of a service provider data center, provider hub, customer premises, or cloud provider premises. Each of SD-WAN edges 108 may be a router, security device such as a firewall, a gateway, a WAN acceleration device, a switch, a cloud router, a virtual gateway, a cloud virtual gateway, an SD-WAN device, or other device that implements aspects of SD-WAN service 101.

In various examples, each of SD-WANs edges 108 may be an on-premises spoke that is a PNF placed at a subscriber branch site in either a hub-and-spoke or full mesh topology; a cloud spoke that is a VNF located in a subscriber's virtual private cloud (VPC) (or equivalent term) within a public cloud; a PNF or VNF located in a service provider cloud operating as a hub device to establish tunnels with the spoke sites (hub devices are multitenant, i.e., shared amongst multiple sites through the use of virtual routing and forwarding instances configured thereon); a PNF or VNF located at an enterprise and operating as an enterprise hub to provide additional hub-like capabilities to a normal spoke site (e.g., act as anchor point for spokes for dynamic virtual private network (VPN) creation, provide an on-premises central breakout option, host a data center department, import routing protocol routes to create a dynamic LAN segment, and meshing with other enterprise hubs that belong to the same tenant/subscriber). Each of SD-WAN edges may be located at the location of any of sites 106, hub 112, cloud 114, or cloud service 116.

SD-WAN edges 108 are logically located at the boundary between the provider SD-WAN service 101 and the subscriber network. SD-WAN edges 108 have network-side interfaces for the underlay connection and subscriber-side interfaces for communication with the subscriber network. As noted above, SD-WAN edges 108 may have multiple paths to each other (diverse underlay connections). For example, in a hub-and-spoke deployment, SD-WAN edge 108A has multiple paths, each via a different one of transport networks 110, to SD-WAN edge 108C of hub 112. Interfaces of SD-WAN edges 108 may primarily be used for underlay connections for user data traffic, but interfaces may also be used for management (Operations, Administration, and Management (OAM)) traffic to, e.g., send performance metrics to service orchestrator 102 and to receive policies, device configurations, and other configuration data from service orchestrator 102.

Service orchestrator 102 may provision and establish overlays tunnels between SD-WAN edges 108 to realize a SD-WAN service 101 topology. In the example of FIG. 1, any of WAN links 142 may be implemented in part using a point-to-point overlay tunnel, e.g., for a virtual private network. Overlay tunnels inherit the performance characteristics of the underlying underlay connection. Overlay tunnels may be encrypted or unencrypted. SD-WAN edges 108 may use any of a variety of encapsulation types, such as MPLS, MPLSoGRE, IP-in-IP, MPLSoUDP, MPLSoGREoIPSec, IPSec, GRE, to implement overlay tunnels.

SD-WAN edges 108 use WAN links 142 to send application traffic across the SD-WAN service 101 to other SD-WAN edges 108. WAN links 142 typically but do not necessarily traverse different underlay connections between SD-WAN edges 108. N WAN links 142A-A-142A-N connect SD-WAN edge 108A and SD-WAN edge 108C. In the example of FIG. 1, each of WAN links 142A-A-142A-N traverses a different one of transport networks 110. Similarly, N WAN links 142N-A-142N-N connect SD-WAN edge 108B and SD-WAN edge 108C, each via a different one of transport networks 110. In a full mesh topology (not shown), additional WAN links would connect SD-WAN edges 108A, 108B. WAN links 142 may also be referred to as "overlay connections," "virtual connections," "tunnel virtual connections," "SD-WAN links," or other terminology that describes WAN links for realizing an SD-WAN service.

In accordance with techniques of some aspects of this disclosure, SD-WAN edge 108B may identify, based on criteria, one or more applications for AMR in a software-defined wide area network (SD-WAN), wherein each criterion of the criteria is associated with a corresponding property of an application. In some examples, the criteria are weighted. SD-WAN edge 108B may determine a breach of one of the SLAs on each WAN link associated with a first application of the one or more applications. SD-WAN edge 108B may apply, in response to determining the breach, AMR for the first application.

In some examples, SD-WAN edges 108 may be configured to identify applications, such as applications associated with application traffic being forwarded through SD-WAN edges 108, for AMR. For example, SD-WAN edge 108B may be configured to identify applications for which QoE is relatively important (also referred to herein as a relatively important application). In some examples, SD-WAN edge 108B may be configured to store criteria, each criterion of the criteria being associated with a corresponding property of an application and, in some examples, each criterion having a corresponding weighting. SD-WAN edge 108B may identify one or more applications for AMR based on the criteria. For example, SD-WAN edge 108B may compare the properties of an application to the criteria and if one or more of the properties of the application match any of the criteria, SD-WAN edge 108B may identify the application as a candidate for AMR or as eligible for AMR. If none of the properties of the application match any of the criteria, SD-WAN edge 108B may identify the application as not being a candidate for AMR or as not being eligible for AMR. In this manner, SD-WAN edge 108B may use criteria to automatically determine whether an application is a candidate for AMR.

SD-WAN edge 108B may monitor each WAN link associated with the identified applications for AMR and determine a breach of an SLA on each WAN link associated with a first application that has been identified as eligible for AMR. SD-WAN edge 108B may apply, in response to determining the breach, AMR for the first application. SD-WAN edge 108B may do so even if AMR was not pre-provisioned for the first application. That is, the first application has not been specifically pre-defined, in configuration data of SD-WAN edge 108B, to have AMR applied and enforced.

In applying AMR for the first application, SD-WAN edge 108B may replicate application packets of the first application on SD-WAN edge 108B and may forward a copy of each of application packet on each WAN link of two or more WAN links. For example, SD-WAN edge 108B may replicate an application packet of the first application and forward a copy of the application packet to SD-WAN edge 108C via both WAN links 142N-A and 142N-N. As such, SD-WAN edge 108C may receive multiple copies of the same application packet. When SD-WAN edge 108C receives multiple copies of the same application packet from SD-WAN edge 108B, SD-WAN edge 108C may keep the first arriving application packet and delete or ignore the second arriving application packet. In this manner, the QoE of the application may not suffer as much as if only a single WAN link was used to carry the application traffic.

In some examples, SD-WAN system 100 may not have sufficient resources to apply AMR to an application identified as eligible for AMR. As such, in some examples, SD-WAN edge 108B may be configured to determine whether available resources are sufficient to support AMR for the first application and apply AMR further based on the available resources being sufficient to support AMR for the first application. In some examples, a plurality of applications that have been identified for AMR may each experience SLA violations for each WAN link associated with the application. As such, in some examples, SD-WAN edge 108B may be configured to prioritize the applications identified for AMR. For example, as discussed above, each criterion of the criteria may be assigned a weight that can be used to determine a priority for AMR among applications identified as eligible for AMR. SD-WAN edge 108B may determine a priority for each application of the applications identified for AMR based on cumulative weights of each criterion having a corresponding property that is satisfied by the application. In this manner, if there are sufficient resources to apply AMR for one or more of the identified applications, but not sufficient resources to apply AMR to all identified applications, then SD-WAN edge 108B may use the priorities of each of the identified applications to determine which of the identified applications should have AMR applied. For example, SD-WAN edge 108B may apply AMR to the higher priority applications and refrain from applying AMR to the lower priority applications. As another example, SD-WAN edge 108B may apply AMR to additional applications in order of priority until the resource usage meets a threshold. In some examples, SD-WAN edge 108B may reserve a portion of available resource or of network resources for other purposes, such as new applications. In such examples, SD-WAN edge 108B may refrain from applying AMR to one or more lower priority applications even if there are sufficient resources to apply AMR to the one or more lower priority applications.

Service orchestrator 102 may use SD-WAN controller 104 to deploy SD-WAN service 101 in various architectural topologies, including mesh and hub-and-spoke. A mesh topology is one in which traffic can flow directly from any site 106 to another other site 106. In a dynamic mesh, SD-WAN edges 108 conserve resources for implementing full-mesh topologies. All of the sites in the full mesh are included in the topology, but the site-to-site VPNs are not brought up until traffic crosses a user-defined threshold called the Dynamic VPN threshold. Sites in the mesh topology may include sites 106, cloud 114, and/or cloud service 116. In a hub-and-spoke topology, all traffic passes through hub 112, more specifically, through SD-WAN edge 108C deployed at provider hub 112. By default, traffic to the Internet also flows through provider hub 112. In a hub-and-spoke topology, network services (e.g., firewall or other security services) may be applied at the central hub 112 location, which allows all network traffic for SD-WAN service 101 to be processed using the network services at a single site. SD-WAN service 101 may have a regional hub topology that combines full mesh and hub-and-spoke using a one or more regional hubs that connect multiple spokes to a broader mesh.

In some examples, SD-WAN controller 104 includes a route reflector (not shown) to facilitate routing in SD-WAN service 101. The route reflector forms overlay Border Gateway Protocol (BGP) sessions with SD-WAN edges 108 to receive, insert, and reflect routes.

SD-WAN edges 108 receive ingress network traffic from corresponding subscriber sites and apply SD-WAN service 101 to forward the network traffic via one of the WAN links 142 to another one of SD-WAN edges 108. SD-WAN edges 108 receive network traffic on WAN links 142 and apply SD-WAN service 101 to, e.g., forward the network via one of the WAN links 142 to another one of SD-WAN edges 108 (where the SD-WAN edge is a hub) or to the destination subscriber site.

To apply SD-WAN service 101, SD-WAN edges 108 process network traffic according to routing information, policy information, performance data, and service characteristics of WAN links 142 that may derive at least in part from performance, bandwidth constraints, and behaviors of the underlay connections. SD-WAN edges 108 use dynamic path selection to steer network traffic to different WAN links 142 to attempt to meet QoS/QoE requirements defined in SLAs and configured in SD-WAN edges 108 for SD-WAN service 101, or to route around failed WAN links, for example. For example, SD-WAN edge 108A may select WAN link 142A-A that is a low-latency MPLS path (in this example) for VoIP traffic, while selecting WAN link 142A-N that is a low-cost, broadband Internet connection for file transfer/storage traffic. SD-WAN edges 108 may also apply traffic shaping. The terms "link selection" and "path selection" refer to the same operation of selecting a WAN link for an application and are used interchangeably.

SD-WAN edges 108 process and forward received network traffic for SD-WAN service 101 according to policies and configuration data from service orchestrator 102, routing information, and current network conditions including underly connection performance characteristics. In some examples, service orchestrator 102 may push SLA parameters, path selection parameters and related configuration to SD-WAN edges 108, and SD-WAN edges 108 monitors the links for SLA violations and can apply AMR to applications identified for AMR or switch an application to a different one of WAN links 142. SD-WAN edges 108 may thereby implement the data plane functionality of SD-WAN service 101 over the underlay connections including, in such examples, applying AMR to applications and application switching to different WAN links 142 for application QoE. If there is an SLA violation detected by one of SD-WAN edges 108, the SD-WAN edge may or may not apply AMR as described throughout this disclosure, but may nonetheless report and send log messages to service orchestrator 102 describing the SLA violation and the selected WAN link. SD-WAN edges 108 may also aggregate, optionally average, and report SLA metrics for WAN links 142 in log messages to service orchestrator 102. In some examples, service orchestrator 102 may receive SLA metrics from SD-WAN edges 108, determine an SLA for an application has been violated, and perform path selection to select a new one of WAN links 142 for the SLA-violated application. Service orchestrator 102 may then configure one or more of SD-WAN edges 108 to switch the application traffic for the application on the new WAN link. SLA metric analysis, SLA evaluation, path selection, and link switching functionality are all performed by SD-WAN system 100, but different examples of SD-WAN system 100 may have a different distribution of control plane functionality between service orchestrator 102 and SD-WAN edges 108 than those examples just described. However, such functionality is described below primarily with respect to SD-WAN edges 108.

SD-WAN edges 108 may forward traffic based on application flows. Application flows packets can be identified using packet characteristics, such as layer 3 and layer 4 (e.g., TCP, UDP) header fields (e.g., source/destination layer 3 addresses, source/destination ports, protocol), by deep packet inspection (DPI), or other flow identification techniques for mapping a packet to an application or, more specifically, an application flow. An application flow may include packets for multiple different applications or application sessions, and a single application may be split among multiple application flows (e.g., separate video and audio streams for a video conferencing application).

SLAs may specify applicable application flows and may include policies for application flow forwarding. SD-WAN edges 108 may identify application flows and apply the appropriate policies to determine how to forward the application flows. For example, SD-WAN edges 108 may use application-specific QoE and advanced policy-based routing (APBR) to identify an application flow and specify a path for the application flow by associating SLA profiles to a routing instance on which the application flow is to be sent. The routing instance may be a virtual routing and forwarding instance (VRF), which is configured with interfaces for the WAN links 142.

QoE aims to improve the user experience at the application level by monitoring the class-of-service parameters and SLA compliance of application traffic and facilitating placement of application data on SLA-compliant WAN links 142 (or the most SLA-compliant WAN link available) or facilitating the use of AMR for applications identified for AMR. For example, SD-WAN edges 108 and service orchestrator 102 may monitor the application traffic for an application for SLA compliance. In some examples, SD-WAN edges 108 (independently or by direction from service orchestrator 102) may move the application traffic from WAN 142 links that fail to meet the SLA requirements to one of WAN links 142 that meets the SLA requirements or apply AMR to an application identified for AMR when all WAN links associated with the application fail to meet the SLA requirements.

To monitor the SLA compliance of the link on which the application traffic is sent, service orchestrator 102 may cause SD-WAN edges 108 to send inline probes along WAN links 142 (in some cases along with the application traffic already being sent). These inline probes may be referred to as "passive probes." To identify the best available one of WAN links 142 for an application in case the active WAN link fails to meet the SLA criteria, service orchestrator 102 monitors and collects SLA compliance data for other available WAN links 142 for SD-WAN service 101. The probes that service orchestrator 102 sends over other WAN links 142 to check the SLA compliance may be referred to as "active probes." The active probes are carried out based on probe parameters provided in some cases by the subscriber. Active and passive probe measurements are used for an end-to-end analysis of WAN links 142. The data collected by active and passive probing is used for monitoring the network for sources of failures or congestion. If there is a violation detected for any application or group of multiple applications ("application group"), service orchestrator 102 evaluates the synthetic probe metrics to determine a satisfactory, and in some cases best, WAN link 142 that satisfies the SLA. As used herein, reference to an application may refer to a single application or any application group.

Configuring service orchestrator 102 to cause SD-WAN system 100 to apply QoE for SD-WAN service 101 may involve configuring multiple profiles of various profile types that enable the user to parameterize QoE for various applications application groups having traffic transported by SD-WAN service 101. A profile typically includes human-readable text that defines one or more parameters for a function or associates the profile with other profiles to parameterize higher-level functions. In various example, service orchestrator 102 may offer a variety of configuration schemes for parameterizing QoE for SD-WAN service 101.

A subscriber or network administrator can interact with service orchestrator 102 to create an SLA profile for an application, referred to herein as an "application SLA profile" or simply an "SLA profile." An SLA profile may include SLA configuration data, such as a traffic type profile, an indication of whether local breakout is enabled, a path preference (e.g., an indication of a preferred WAN link of WAN links 142 or type of WAN link (e.g., MPLS, Internet, etc.)), an indication of whether failover is permitted when an active WAN link has an SLA violation of the SLA profile, the criteria for failover (e.g., violation of any SLA parameters or violation of all SLA parameters required to trigger failover). In some examples, a network administrator may interact with service orchestrator and or SD-WAN edges 108 to provision AMR for selected applications or to customize the criteria and/or weightings used by SD-WAN edges 108 to identify and prioritize applications for AMR.

SLA parameters may be included in an SLA metric profile that is associated with or otherwise part of an SLA profile. Service orchestrator 102 and SD-WAN edges 108 may use SLA parameters to evaluate the SLA of WAN links 142. SLA parameters may include parameters such as throughput, latency, jitter, jitter type, packet loss, round trip delay, or other performance metrics for traffic (which correlate and correspond to performance metrics for a WAN link that carries such traffic). Throughput may refer to the amount of data sent upstream or received downstream by a site during a time period. Latency is an amount of time taken by a packet to travel from one designated point to another. Packet loss may be specified as a percentage of packets dropped by the network to manage congestion. Jitter is a difference between the maximum and minimum round-trip times of a packet.

An SLA profile may further specify SLA sampling parameters and rate limiting parameters. Sampling parameters may include session sampling percentage, SLA violation count, sampling period, and switch cool off period. Session sampling percentage may be used to specify the matching percentage of sessions for which service orchestrator should run passive probes. SLA violation count is used to specify the number of SLA violations after which the service orchestrator should switch to a different one of WAN links 142 or consider the SLA to be breached when determining whether to apply AMR for a given application. Sampling period may be used to specify the sampling period for which the SLA violations are counted. Switch cool off period may be used to specify a waiting period, after which a WAN link switch should happen if an active link comes back online after failure or after which AMR should be ceased for a given application. This parameter helps prevent frequent switching of traffic between active and backup WAN links 142 or prevent frequent switching between an AMR mode and a normal mode.

Rate limiting parameters may include maximum upstream rate, maximum upstream burst size, maximum downstream rate, maximum downstream burst size, and loss priority. Maximum upstream rate may be used to specify the maximum upstream rate for all applications associated with the SLA profile. Maximum upstream burst size may be used to specify the maximum upstream burst size for all applications associated with the SLA profile. Maximum downstream rate may be used to specify the maximum downstream rate for all applications associated with the SLA profile. Maximum downstream burst size may be used to specify the maximum downstream burst size for all applications associated with the SLA profile. Loss priority may be used to select a loss priority based on which packets can be dropped or retained when network congestion occurs. The probability of a packet being dropped by the network is higher or lower based on the loss priority value.

An application SLA profile may be specified using an SLA rule that includes all required information to measure SLA and to identify whether any SLA violation has occurred. An SLA rule may contain the complete probe profiles, time period in which the profile is to be applied, preferred SLA configuration, and other SLA parameters described above (e.g., SLA sample parameters, rate limiting parameters, metrics profile). An SLA rule is associated with an application or application group and to become its SLA profile. In other words, an SLA profile for an application may be a particular SLA rule (e.g., "SLA3") as configured in service orchestrator 102. In some cases, the SLA rule may be associated in this way by association with an APBR rule that is matched to an identified application or application group. As noted above, in some examples, service orchestrator 102 may push SLA parameters, path selection parameters, routing information, routing and interface data, and related configuration to SD-WAN edges 108, and SD-WAN edges 108 monitors the links for SLA violations and can apply AMR to an application identified for AMR or switch an application to a different one of WAN links 142.

SLA violations occur when the performance of a link is below acceptable levels as specified by the SLA. To attempt meet an SLA, SD-WAN system 100 may monitor the network for sources of failures or congestion. If SD-WAN system 100 determines an SLA violation has occurred, SD-WAN system 100 may determine an alternate path to select the best WAN link 142 that satisfies the SLA. Similarly, SD-WAN edges 108 may monitor for SLA violations. If one of SD-WAN edges 108 determines an SLA violation or breach has occurred on all WAN links associated with an application identified for AMR, the SD-WAN edge may apply AMR to that application.

An overlay path includes the WAN links 142 that are used to send the application traffic for an application. SD-WAN system 100 may assign applications to a particular WAN link 142 based on the SLA metrics of the WAN link 142. A destination group is a group of multiple overlay paths terminating at a destination.

In general, service orchestrator 102 configures SD-WAN edges 108 to recognize application traffic for an application, and service orchestrator 102 specifies paths for certain traffic by associating SLA profiles to routing instances by which SD-WAN edges 108 send application traffic to satisfy rules of an APBR profile.

APBR enables application-based routing by service orchestrator 102 that is managing SD-WAN edges 108. An APBR profile specifies matching types of traffic, e.g., by listing one or more applications or application groups. The APBR profile may include multiple APBR rules that each specifies one or more applications or application groups. If network traffic matches a specified application, the rule is considered a match. An SLA rule may be associated with a APBR rule to specify how matching traffic should be handled for QoE. An APBR rule may also specify a routing instance to be used by SD-WAN edges 108 to route traffic matching the APBR rule. The routing instance may have interfaces for one or more WAN links 142. Service orchestrator 102 configures SD-WAN edges 108 with an APBR profile (or configuration data derived therefrom) to cause SD-WAN edges 108 to use APBR in accordance with the APBR profile to implement SD-WAN service 101.

In some examples, SD-WAN edges 108 (e.g., SD-WAN edge 108A) process packets received on an interface to identify the application for the packets. SD-WAN edge 108A may apply an APBR profile to attempt to match the application to an APBR rule therein. If a matching APBR rule is not found, SD-WAN edge 108A forwards the packets normally. If a matching APBR rule is found, however, SD-WAN edge 108A uses the routing instance specified in the APBR rule to route the packets.

A routing instance has associated interfaces for one or more links used by the routing instance to send and receive data. The routing instance, configured in SD-WAN edges 108 and which may be associated with an APBR rule, has interfaces for WAN links 142 to send and receive application traffic. These interfaces may be interfaces for underlay connections.

SD-WAN edges 108 may route traffic using different links based on the link preference determined using SLA rules 122. In some cases, service orchestrator 102 determines application performance on a WAN link of WAN links 142 by computing a score based on latency, round-trip time, jitter, packet loss, and/or other factors. Based on the respective scores for one or more of WAN links 142, service orchestrator 102 and SD-WAN edges 108 may divert application traffic to an alternate WAN link for SD-WAN service 101 if performance of the current link is below acceptable levels as specified by one of SLA rules 122. In some cases, the new WAN links is that WAN link that best serves the SLA requirement, as determined by the score. As already noted, service orchestrator 102 may measure and monitor application performance on WAN links 142 using probes.

In some examples, multiple WAN links 142 may meet SLA requirements for an application. SD-WAN system 100 may select, from these multiple WAN links 142, the WAN link that matches a link preference configured by the user. This preference may be based at least in part on link type and link priority for the WAN links 142. For example, for SD-WAN edge 108A, SD-WAN system 100 may select one of WAN links 142A-A-142A-N that matches the preferred link type (e.g., MPLS) to reach SD-WAN edge 108C. If there are multiple such WAN links 142 with this preference, the WAN link with the highest priority among them is selected. If there is no priority or link type preference configured, then a random path or the default path is selected. If no WAN links 142 that meet the SLA requirements are available, then the best available WAN link in terms of the highest SLA score and link type preference, where strict affinity is configured, is selected. If multiple WAN links 142 that meet the SLA requirements are available, then the one with the highest priority is selected. One or more of the WAN links 142 may be configured with a priority, which may be expressed in the configuration as an integer value that represents the priority. Service orchestrator 102 prefers higher-priority WAN links 142 over lower-priority WAN links 142.

In service orchestrator 102, a user can configure link types (e.g., IP or MPLS) and set priorities for WAN links 142 for an application. For example, the user can define an APBR profile with the WAN links 142 and configure the WAN links 142 with link types/priorities.

By associating an APBR rule specifying an application or application groups with an APBR profile, service orchestrator 102 and SD-WAN edges 108 enforce link preference at the application or application group level to implement SD-WAN service 101. The user may further specify the link type preferences and, in some cases, link-type affinity in an SLA rule. The SLA rule is attached to the APBR rule to associate the preferences with the applications specified in the APBR rule.

Based on the APBR profile, SD-WAN edges 108 match network traffic to applications and application groups specified in the associated APBR rule and may, for example, forward the traffic to the static route and the next-hop address as specified in the routing instance also associated with the APBR rule associated with the APBR profile. SD-WAN system 100 may assign application traffic to a particular path/link based on the configured link type and preference for WAN links 142 and, in some cases, the specified link-type affinity used in the SLA rule (as described above).

The link-type affinity may be strict or loose (optionally the default setting) for a preferred link type. For the strict affinity, SD-WAN system 100 selects a WAN link that is always of the preferred link type. For loose affinity, if there are no WAN links 142 that meet the SLA and belong to the preferred link type, then service orchestrator 102 selects a link that does not have the preferred link type but that otherwise meets the SLA.

Service orchestrator 102 may implement SD-WAN policy intents for SD-WAN service 101 to facilitate better WAN links 142 utilization and efficiently distribute application traffic. A subscriber may set a high-level SD-WAN policy that includes one or more SD-WAN policy intents. Each SD-WAN policy intent may have the following parameters: source, destination, and SLA profile. The source is one or more source endpoints selected from a list of sites, site groups, departments, or a combination thereof. The SD-WAN policy intent is applied to the selected source endpoint. The destination is a destination endpoint selected from a list of applications and predefined or custom application groups. The SD-WAN policy intent is applied to the selected destination endpoint. Applications may be defined using network information (e.g., source or destination prefixes), by protocol, or by application name, for instance. The SLA profile may be defined as described above has the SLA parameters to be applied for the policy intent for which the SLA profile is set.

An SLA rule of SLA rules 122 specifies one or more applications or applications. As used herein, this or other association between an application and SLA parameters for an application mean that the application has an SLA (or SLA rule). If the SLA parameters are violated, the SLA/SLA rule for the application is violated.

SD-WAN system 100 may determine available bandwidth for one of WAN links 142 (e.g., WAN link 142A-A) using a variety of methods. For instance, SD-WAN system 100 may obtain link data that indicates an available bandwidth or a total bandwidth for WAN link 142A-A. SD-WAN controller 104 may provide the link data to service controller 102, which may be obtained in part from SD-WAN edges 108. The link data may be configuration data for the underlay connection of WAN link 142A-A. SD-WAN system 100 may sum required bandwidths for applications placed on WAN link 142A-A and compute the available bandwidth as the difference between the total bandwidth of WAN link 142A-A and the sum of the required bandwidths for the applications placed on WAN link 142A-A.

By identifying applications for AMR based on criteria, SD-WAN edge 108B may save a network administrator from having to determine the applications for which to provision AMR and from having to manually provision such applications. This may reduce the likelihood of human error in the process and more quickly implement AMR, thereby providing better QoE, particularly for relatively more important applications or those applications meeting a particular application profile prioritized by an administrator for automatic AMR. The application profile may be defined by the administrator using the criteria, and in some cases by the criteria in combination with the weights for the criteria.

Although described primarily as being performed by SD-WAN edge 108B, the techniques described herein for automatically identifying applications eligible for AMR by be performed by other SD-WAN edges 108, as well as in part by SD-WAN controller 104. For example, SD-WAN controller 104 may receive telemetry data indicating conditions for WAN links 142 and properties of applications being processed by SD-WAN service 101, determine an application is eligible for AMR, and direct one or more of SD-WAN edges 108 to apply AMR.

Figure 2:
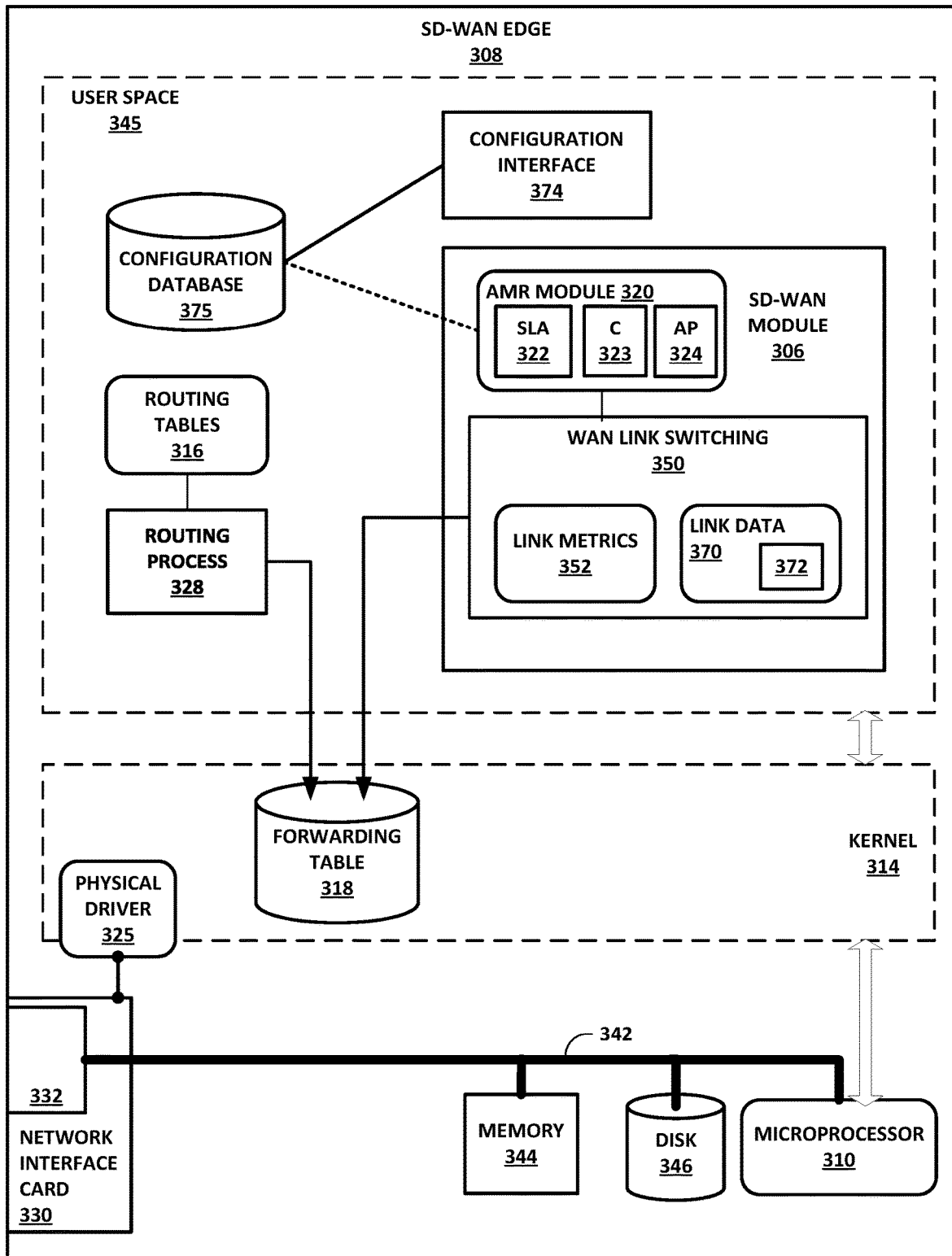
FIG. 2 is a block diagram illustrating an example SD-WAN edge device in further detail, according to techniques described in this disclosure.

FIG. 2 is a block diagram illustrating an example SD-WAN edge device in further detail, according to techniques described in this disclosure. SD-WAN edge device 308 ("SD-WAN edge 308") may represent any of SD-WAN edges 108 of FIG. 1. SD-WAN edge 308 is a computing device and may represent a PNF or VNF. SD-WAN edge 308 may include one or more real or virtual servers configured to execute one or more VNFs to perform operations of an SD-WAN edge.

SD-WAN edge 308 includes in this example, a bus 342 coupling hardware components of a hardware environment. Bus 342 couples network interface card (NIC) 330, storage disk 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory. Interfaces 332 may be interfaces for underlay connections of WAN links configured for SD-WAN module 306 between SD-WAN edge 308 and one or more other SD-WAN edges.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use NIC 330.

The hardware environment and kernel 314 provide a user space 345 operating environment for SD-WAN edge 308 modules, including routing process 328, configuration interface 374, and SD-WAN module 306. Configuration interface 374 enables SD-WAN controller 104 or an operator to configure SD-WAN edge 308. Configuration interface 374 may provide a NETCONF interface, Simple Network Management Protocol (SNMP), a command-line interface, a RESTful interface, Remote Procedure Calls, or other interface by which remote devices may configure SD-WAN edge 308 with configuration information stored to configuration database 375. Configuration information may include, e.g., SLA rules 322 that partially define operation of WAN link switching module 350 for SD-WAN module 306, routes, and virtual routing and forwarding instances (VRFs) configured with interfaces for WAN links, interfaces configurations that specify link type (IP, MPLS, mobile, etc.), priority, maximum bandwidth, encapsulation information, type of overlay tunnel, and/or other link characteristics.

Routing process 328 executes routing protocols to exchange routing information (e.g., routes) with other network devices and uses the routing information collected in routing table 316 to select the active route to each destination, which is the route used by SD-WAN edge 308 to forward incoming packets to that destination. To route traffic from a source host to a destination host via SD-WAN edge 308, SD-WAN edge 308 learns the path that the packet is to take. These active routes are inserted into the forwarding table 318 of SD-WAN edge 308 and used by the forwarding plane hardware for packet forwarding. For example, routing process 328 may generate forwarding table 318 in the form of a radix or other lookup tree to map packet information (e.g., header information having destination information and/or a label stack) to next hops and ultimately to interfaces 332 for output. In some examples, SD-WAN edge 308 may have a physically bifurcated control plane and data plane in which a switching control card manages one or more packet forwarding line cards each having one or more high-speed packet processors.

SD-WAN edge 308 executes SD-WAN module 306 to implement an SD-WAN service, such as SD-WAN service 101 of FIG. 1. SD-WAN module 306 causes SD-WAN edge 308 to forward traffic based on application flows. SD-WAN module 306 identifies packets of different application flows packets using packet characteristics. Once an application is identified using initial packet(s), information for identifying traffic for application sessions may be stored in flow tables for faster processing. WAN link switching module 350 selects WAN links to assign applications according to routing information, policy information, performance data, and service characteristics of the WAN links for an SD-WAN service implemented by SD-WAN module 306. SD-WAN module 306 may program forwarding table 318 with selected WAN links for applications, flow table data, or other data for mapping application traffic to a selected WAN link.

SD-WAN edge 308 executes AMR module 320. AMR module 320 may include SLA rules 322, criteria (C) 323, and AMR priorities (AP) 324.

In accordance with techniques of this disclosure, AMR module 320 may be configured to identify, based on criteria 323, one or more applications for AMR in SD-WAN system 100 (FIG. 1), wherein each criterion of criteria 323 is associated with a corresponding property of an application, each criterion having an associated weighting. AMR module 320 may be configured to determine a breach of one of the SLAs on each WAN link associated with a first application of the one or more applications and apply, in response to determining the breach, AMR for the first application. Thus, a network device, such as SD-WAN edge 308 using AMR module 320, may automatically identify applications for which AMR should be enabled and apply AMR to such applications.

AMR module 320 may maintain a dynamic list, table, or other data structure, of prioritized applications (e.g., in priorities for AMR priorities 324) for AMR based on application properties or characteristics and/or live traffic patterns in the network. AMR module 320 may continuously analyze traffic in the network and build a list of applications for which AMR is desired or required, for example, based on criteria 323. Once an SLA breach is detected by AMR module 320 for any applications for which QoE is relatively important (e.g., applications on the list of applications for AMR in AMR priorities 324), AMR module 320 may apply AMR to the application, thus ensuring QoE or enhancing QoE over what the QoE otherwise would be for those relatively important applications. In some examples, AMR module 320 may also continuously monitor the SLA for these identified applications for further remediations, such as disabling AMR when the SLA is again met on at least one link associated with the application.

AMR module 320 may dynamically identify relatively important applications and apply AMR to such applications when an associated SLA is violated on all existing WAN links associated with the application. AMR module 320 may also reverse the action (e.g., restore the former operation of the applications) when one or more of the WAN links recovers. For example, AMR module 320 may identify and prioritize the relatively important applications based on criteria 323 and store such priorities in AMR priorities 324. AMR module 320 may monitor SLAs 322 and apply AMR for applications which the SLA is violated on all associated WAN links. For example, AMR module 320 may monitor all WAN links and ascertain if sufficient resources (CPU and bandwidth) for an identified application are available. In some examples, AMR module 320 may apply AMR for applications further based on priority of the applications.

For example, AMR module 320 may identify, and in some examples, prioritize, the relatively important applications based on criteria 323. In some examples, criteria 323 may include predetermined or default criterion which were programmed by a manufacturer of SD-WAN edge 308. For example, predetermined or default criteria may specify properties or characteristics of an application, which may be a set of applications having a common property or characteristic. In some examples, there may be a plurality of default criteria stored in criteria 323. For example, there may be a different set of criteria for different deployment environments, such as one for deployment in a banking network, one for deployment in an office network, or the like. In some examples, some or all of the criterion in one set of criteria may be different than criterion of another set of criteria. For a criterion that is in more than one set of criteria, the criterion may have an associated weights that differ across the different sets of criteria or that are the same across the different sets of criteria. For example, in one set of criteria, the weight for banking may be 10, while in another set of criteria, the weight for banking may be 2.

Table 1 below is an example of default criteria of criteria 323 which AMR module 320 may use to identify applications for possible application of AMR. In this example, each criterion is assigned a weight within a scale of 1 to 10, with 10 being the most important for using AMR (generally applications where higher QoE is desirable), however, any scale may be used.

TABLE 1

Example Default Criteria for Identifying Applications for AMR

| Application Criteria | Weights (scale of 1-10, 10 being highly preferred) |
| --- | --- |
| RTP-based | 10 |
| Office Applications | 9 |
| Applications with Packet Size < 256 bytes | 8 |

In the example of Table 1, AMR module 320 may assign an RTP-based application with a weight of 10, an office-related application (e.g., word processor, spreadsheet application, presentation application, etc.) with a weight of 9, and applications with a small packet size (<256 bytes) with a weight of 8. While certain criteria and certain weights are described with respect to Table 1, these are set forth as examples and any criteria or weights may be used according to the techniques of this disclosure.

In some examples, a network administrator may choose to modify the default criteria and/or associated weights of criteria 323 for identifying applications for AMR, or, in the case where there are no default criteria, the network administrator may create the criteria and/or weights, based on the network administrator's own use case. In some examples, if the network administrator modifies the default criteria or weights, this may override the default criteria or weights. For example, AMR module 320 may overwrite the default criteria or weights in criteria 323 with the modified criteria or weights. In other examples, the modified criteria or weights may be stored as a separate set of criteria which may then be activated and the original default criteria may be deactivated, but remain stored in criteria 323. Table 2 is an example of custom criteria created or modified by a network administrator.

TABLE 2

Example Custom Criteria for Identifying Applications for AMR

| Application Criteria | Weights (scale of 1-10, 10 being highly preferred |
| --- | --- |
| RTP-based | 4 |
| Office Applications | 5 |

TABLE 2-continued

Example Custom Criteria for Identifying Applications for AMR

| Application Criteria | Weights (scale of 1-10, 10 being highly preferred |
| --- | --- |
| Applications with Packet Size < 256 bytes | 8 |
| Banking/Trading Applications | 9 |
| Streaming Applications | 8 |
| Applications with DSCP Marking | 10 |

In the example of Table 2, AMR module 320 may assign an RTP-based application with a weight of 4, and office-related application with a weight of 5, applications with small packet size (e.g., less than 256 bytes) with a weight of 8, banking and/or trading (e.g., trading stocks, bonds, or other instruments) applications with a weight of 9, streaming applications with a weight of 8, and applications with a differentiated services code point (DSCP) marking with a weight of 10. While certain criteria and certain weights are described with respect to Table 2, these are described as examples and any criteria or weights may be used.

For example, AMR module 320 may monitor the different applications having traffic in SD-WAN system 100 (FIG. 1) and compare the different applications to each criterion of criteria 323. In some examples, there may not be sufficient network resources to apply AMR to each of the relatively important applications when SLA violations occur. To address such examples, AMR module 320 may, for each application identified for AMR, determine a priority of the application based on the weights given for each specific criteria that is met by the application. AMR module 320 may store the respective priorities in AMR priorities 324.

FIG. 3 is a tabular diagram illustrating an example of prioritizing applications based on the criteria. In the example of FIG. 3, criteria are depicted in the top row, with each criterion of the criteria having an associated weight, shown in the second row. For example, RTP is a criterion having a weight of 4. Various applications are listed in the left column, such as a first video meeting application. An "X" in the table indicates that an application meets a specified criterion. For example, the first video meeting application meets the following criteria: RTP, office-related, packet size smaller than 256 bytes, and streaming. The absence of an "X" in the table indicates that the application does not meet the criterion. For example, the first video meeting application does not meet the banking/trading or the DSCP marking criterion. A summation of each weight for each criterion met for each application is shown as well. For example, the summation of weights for the first video meeting application is 25. AMR module 320 (FIG. 2) may determine a cumulative weight of each criterion having a corresponding property to each identified application for AMR. AMR module 320 may use the cumulative weight for each application to determine a priority of each application. In the example of FIG. 3, the first video meeting application has the highest weight (25) and is therefore assigned the highest priority (shown as 1).

AMR module 320 may determine a summation of weights of the met criteria to determine a priority of each of the identified applications. For example, applications having application traffic on SD-WAN system 100 may include the first video meeting application, a second video meeting, an email application, a stock application, a bank application, an education application, a video application, and an FTP application, as depicted in FIG. 3. The first video meeting application meets the criteria of an RTP application, an office application, has packets of less than 256 bytes, and a streaming application. AMR module 320 may add the weights associated with each of the criteria met by the first video meeting application—resulting in a total weight of 25. The weight of 25 is the highest weight in this example, which results in AMR module 320 assigning the highest priority (priority 1) to the first video meeting application. AMR module 320 may add the weights associated with each of the identified applications in a similar manner. As such, the second video meeting application, the stock application, and the banking application in this example each have a total weight of 17 resulting in a priority 2 for such applications. The email and education applications in this example have a total weight of 5, resulting in a priority 3 for such applications. In this example, the video application and the FTP application do not meet any criteria (shown as no matches). As such, AMR module 320 may identify the video application and the FTP application as not needing AMR or not being worth a resource cost associated with applying AMR. For example, AMR module 320 may assign a priority of 0 to such applications, to indicate that such applications should not be considered for AMR even if an associated SLA for either of the applications is breached on all associated WAN links. As such, even if all WAN links associated with the video application or the FTP application fail, AMR module 320 may not apply AMR to the application. In some examples, AMR module 320 may store a table, list or other data structure or entry in AMR priorities 324 indicative of the priority of each application.

AMR module 320 may actively monitor the applications having a priority assigned in AMR priorities 324 for any SLA breach or violations. In some examples, AMR module 320 may not monitor the applications assigned a priority of 0 for any SLA breach or violations. In other examples, AMR module 320 may also monitor the applications assigned a priority of 0 for any SLA breach or violations.

The SLA metrics may include jitter, latency, packet loss, bandwidth or other SLA metrics and may be customized for each application. When an SLA is not met across the available WAN links for an identified application in AMR priorities 324, AMR module 320 may detect such a condition and apply AMR for that application. In some examples, AMR module 320 may determine whether sufficient resources, such as central processing unit (CPU) and link bandwidth, are available and only apply AMR for that application when sufficient resources are available. For example, once AMR module 320 determines an SLA breach has occurred for all associated links for a particular application, AMR module 320 may perform a resource check before applying AMR for that application. As a part of the resource check, system parameters like CPU and link bandwidth may be defined and evaluated to avoid congestion and overload conditions in SD-WAN system 100. In some examples, AMR module 320 may apply a modifier to available resources, such as 90%, 80%, or 70% of link bandwidth, or use a predetermined threshold, when determining available resources so as to reserve some resources for other purposes, such as application traffic from a new application.

In some examples, if an SLA breach occurs for more than one application, AMR module 320 may determine whether to apply AMR based further on the priority assigned to the applications. For example, if both the first video meeting application and the second video meeting application are experiencing SLA breaches on all WAN links, and there are only sufficient resources for using AMR with one of the two applications, AMR module 320 may apply AMR for the first video meeting application, but not for the second video meeting application, as the first video meeting application has a higher priority than the second video meeting application.

FIG. 4 is a tabular diagram illustrating an example of when AMR is applied. In the example of FIG. 4, the first video meeting application (having priority 1—the highest priority) is experiencing SLA violations on both WAN link 1 and WAN link 2, as indicated by the "X" in the WAN link 1 and the WAN link 2 columns. As such, AMR module 320 may apply AMR for the first video meeting application. The other applications identified for AMR may only be experiencing SLA violations on either WAN link 1 or WAN link 2, as indicated by the "X" in the respective columns. Therefore, AMR module 320 may not apply AMR for those applications, even though those applications have been identified as eligible for AMR. In this example, the video application and the FTP application are not eligible for AMR as they do not meet any of the criteria (indicated as no matches).

AMR module 320 may monitor and determine SLA violations, conduct resource checks, and apply AMR for the first video meeting application based on the determined SLA violations, and there being sufficient resources available to support AMR for the first video meeting application. AMR module 320 may continue monitoring the SLA status and disable AMR for the first video meeting application when the SLA is again met for that application. In this manner, AMR module 320 may free up network resources that were supporting AMR for the first video meeting application that are no longer needed to meet the SLA for the first video meeting application.

Figure 5:
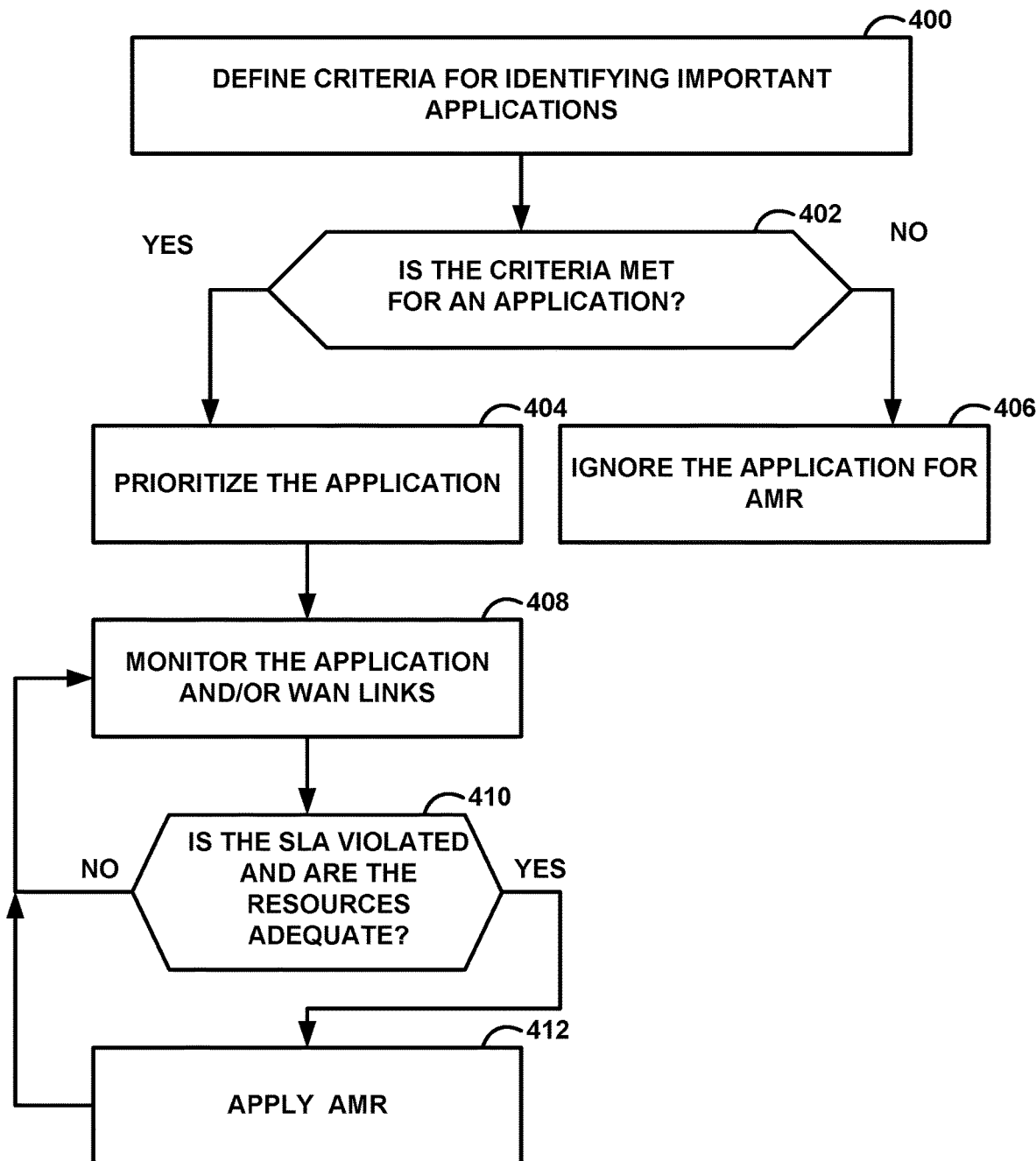
FIG. 5 is a flow diagram illustrating an example of automatic identification of applications for AMR and application of AMR techniques.

FIG. 5 is a flow diagram illustrating an example of automatic identification of applications for AMR and application of AMR techniques. A network device manufacturer, a network administrator, or AMR module 320 may define criteria for identifying important applications (400). For example, a network device manufacturer, a network administrator, or AMR module 320 may define criteria and may assign a weight to each criterion. Each criterion of the criteria may be associated with a corresponding property of an application, e.g., an RTP application, an office-related application, an application having small packet sizes, a banking/trading application, a streaming application, an application with DSCP marking, or the like. In some examples, the criteria are predetermined. In some examples, the criteria and/or weights are dynamic and AMR module 320 may autonomously (i.e., without input from a network operator, customer, or other human agent) modify the criteria and/or weights based on the type of application traffic being experienced at a given time, network resources, network conditions, deployment topology, a deployment environment or type of business of the network operator or SD-WAN service customer, or the like. For example, AMR module 320 may add a new criterion to the criteria or remove a criterion from the criteria. For example, for a deployment in a banking network, AMR module 320 may automatically remove one or more criterion that are less important to the operation of a banking business or add a banking criterion if one is not already included in the default or predetermined criteria. In some examples, rather than, or in addition to, modifying the criteria, AMR module 320 may modify one of more of the weights associated with the criteria. For example, AMR module 320 may increase or decrease a weight associated with a criterion or add a weight for a new criterion. For example, for a deployment in a banking network, AMR module 320 may increase the weight associated with a banking criterion and/or the weight associated with small packet sizes. In some examples, at least some of the above operations may be performed by an SD-WAN controller that then configures SD-WAN module 306 with criteria and/or weights of criteria 323.

AMR module 320 may determine whether any of the criteria are met for an application (402). For example, AMR module 320 may compare the criteria to properties of an application to determine whether any of the criteria are met for the application. If none of the criteria are met for the application (the "NO" path from box 402), AMR module 320 may ignore the application for AMR (406). For example, AMR module 320 may determine the application does not need AMR or the cost of applying AMR to the application outweighs the benefit of applying AMR for the particular application. In some examples, AMR module 320 may give such an application a priority of 0.

If any of the criteria are met for the application (the "YES" path from box 402), AMR module 320 may prioritize the application (404). For example, AMR module 320 may sum together weights associated with each criterion of the criteria which the application meets to arrive at a total weight. AMR module 320 may compare the total weight of the application to the total weights of other applications to determine the priority for the application. For example, if the total weight associated with the current application is the highest of all the applications, then AMR module 320 may assign the current application with the highest priority, for example, priority 1. If the total weight associated with the current application is the lowest of all the applications, then AMR module 320 may assign the current application with the lowest priority of those applications that are identified as eligible for AMR.

AMR module 320 may monitor the application and/or WAN links associated therewith for any violation of an SLA associated with the application (408). For example, AMR module 320 may monitor the performance (e.g., bandwidth, jitter, latency, etc.) of WAN links associated with the application AMR module 320 may determine whether the SLA is violated and whether the resources are adequate to apply AMR to the application (410). For example, AMR module 320 may compare the performance to SLA rules 322 to determine whether the SLA is violated. AMR module 320 may determine resource availability and compare resource availability to expected resource costs for applying AMR to the application to determine whether resources are adequate. In some examples, when determining whether resources are adequate to apply AMR to the application, AMR module 320 may apply a modifier to the amount of available resources, such as a percentage, in order to reserve a predetermined amount of network resources for other purposes, such as handling traffic from a new application.

If AMR module 320 determines that the SLA is violated and there are adequate resources to apply AMR to the application (the "YES" path from box 410), AMR module 320 may apply AMR to the application (412). For example, AMR module 320 may replicate packets of the application and may forward a copy of each of application packet on each WAN link of two or more WAN links towards a receiving network device, e.g., link 142N-A and link 142N-N of FIG. 1. If AMR module 320 determines that either the SLA is not violated, the resources are not adequate, or both the SLA is not violated and the resources are not adequate, AMR module 320 may not apply AMR and return to monitoring the application and/or the WAN links (408). In some examples, if the SLA is violated, the resources are not adequate, and the application has a higher priority than another application for whom AMR is already being applied, AMR module 320 may cease applying AMR to the lower priority application and, if resources are adequate to apply AMR to the higher priority application, AMR module 320 may apply AMR to the higher priority application.

Figure 6:
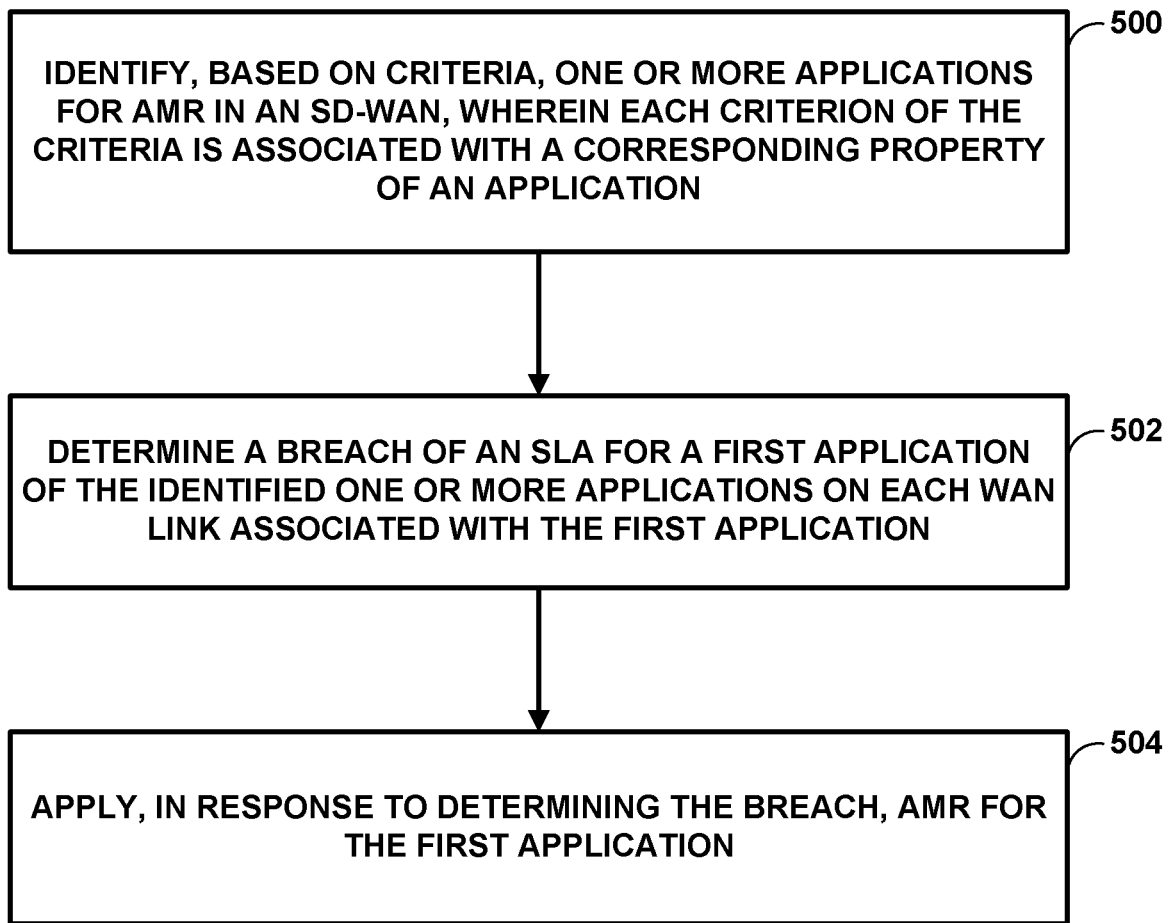
FIG. 6 is a flow diagram illustrating another example of automatic identification of applications for AMR and application of AMR techniques.

FIG. 6 is a flow diagram illustrating another example of automatic identification of applications for AMR and application of AMR techniques. For example, AMR module 320 (FIG. 2) may identify, based on criteria, one or more applications for AMR in an SD-WAN, wherein each criterion of the criteria is associated with a corresponding property of an application (500). For example, AMR module 320 may compare one or more applications to criteria 323 (FIG. 2) to identify the one or more applications for possible application of AMR. For example, AMR module 320 may identify an application as an application for AMR based on the application having at least one property that matches at least one of the criteria. AMR module 320 may identify and application as not being an application for AMR based on the application not having at least one property that matches at least one of the criteria.

AMR module 320 may determine a breach of an SLA for a first application of the identified one or more applications on each WAN link associated with the first application (502). For example, AMR module 320 may determine that the performance (e.g., bandwidth, latency, jitter, or other performance metric) of each WAN link associated with the first application is below the requirements of the SLA associated with the first application. In some examples, each WAN link may breach the SLA in the same manner, for example each WAN link may breach the SLA due to low bandwidth. In some examples, each WAN link may breach the SLA in a different manner, for example one WAN link may breach the SLA due to low bandwidth, while another WAN link may breach the SLA due to high latency. In some examples, some of the WAN links may breach the SLA in the same manner, while one or more WAN links may breach the SLA in a different manner.

AMR module 320 may apply, in response to determining the breach, AMR for the first application (504). For example, AMR module 320 may replicate application packets of the first application and forward a copy of each application packet on each WAN link of over at least two WAN links.

In some examples, AMR is not pre-provisioned for the first application. For example, a network administrator has not manually provisioned AMR for the first application.

In some examples, the criteria are predetermined and include at least one of RTP, office-related, size, banking, trading, or DSCP marking. In some examples, AMR module 320 may autonomously modify the criteria. In some examples, each criterion of the criteria has an associated weighting and AMR module 320 may autonomously modify one or more weightings associated with the criteria.

In some examples, AMR module 320 may determine that available resources of SD-WAN edge 308 are sufficient to support AMR for the first application, wherein the applying AMR to the first application is based on the available resources being sufficient to support AMR for the first application.

In some examples, the identified one or more applications include a second application. In some examples, each criterion of the criteria has an associated weighting. In some examples, AMR module 320 may determine, based on the criteria, a first priority for the first application and a second priority for the second application, the first priority being higher than the second priority. In some examples, AMR module 320 may determine a breach of one of the one or more SLAs on each WAN link associated with the second application. In such examples, AMR module 320 may determine that available resources are not sufficient to support AMR for both the first application and the second application. In such examples, AMR module 320 may apply AMR for the first application and refraining from applying AMR for the second application based on the first priority being higher than the second priority In some examples, the first priority is based on cumulative weights of each criterion having a corresponding property to the first application and the second priority is based on cumulative weights of each criterion having a corresponding property to the second application.

In some examples, AMR module 320 is configured to transmit a copy of a packet associated with the first application via each of two or more WAN links.

In some examples, the techniques of this disclosure are performed by SD-WAN edge 308. In some examples, the identifying one or more applications for AMR and the determining the breach of an SLA are performed by SD-WAN controller 104 (FIG. 1), and SD-WAN controller 104 outputs configuration data to cause SD-WAN edge 308 to apply AMR for the first application.

The techniques of this disclosure have several potential advantages over other techniques. For example, the techniques of this disclosure provide for the dynamic identification of relatively important applications. The techniques of this disclosure facilitate the enabling and disabling AMR for a given application on demand. The techniques of this disclosure may provide for better application QoE for relatively important applications. The techniques of this disclosure may provide for better administration and effective utilization of WAN links and system resources. The techniques of this disclosure may reduce the burden on network administrators in determining whether AMR should be provisioned for a given application and in manually provisioning AMR for such applications.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A network device comprising:
  memory configured to store information associated with one or more service level agreements (SLAs) for a plurality of applications in a software-defined wide area network (SD-WAN), the plurality of applications not being pre-provisioned for application-based multipath routing (AMR); and
  an AMR module comprising processing circuitry, the AMR module being configured to:
    compare criteria to at least one property of at least one of the plurality of applications to determine whether any criterion of the criteria is met by the at least one property;
    identify, based on the at least one property of the at least one of the plurality of applications meeting any criterion of the criteria, one or more of the plurality of applications as eligible for AMR;
    determine a breach of one of the SLAs on each WAN link associated with a first application of the identified one or more of the plurality of applications; and
    apply, in response to determining the breach, AMR for the first application.

2. The network device of claim 1, wherein the criteria are predetermined and comprise at least one of real-time transport protocol (RTP), office-related, size, banking, trading, or differentiated services code point (DSCP) marking.

3. The network device of claim 1, wherein the AMR module is further configured to autonomously modify the criteria.

4. The network device of claim 1, wherein each criterion of the criteria has an associated weighting and wherein the AMR module is further configured to autonomously modify one or more weightings associated with the criteria.

5. The network device of claim 1, wherein the AMR module is further configured to:
  determine that available resources of the network device are sufficient to support AMR for the first application, wherein the applying AMR to the first application is further based on the available resources being sufficient to support AMR for the first application.

6. The network device of claim 1, wherein the identified one or more applications comprise a second application, wherein each criterion of the criteria has an associated weighting, and wherein the AMR module is further configured to:

determine, based on the criteria, a first priority for the first application and a second priority for the second application, the first priority being higher than the second priority;

determine a breach of one of the one or more SLAs on each WAN link associated with the second application;

determine that available resources are not sufficient to support AMR for both the first application and the second application; and apply AMR for the first application and refrain from applying AMR for the second application based on the first priority being higher than the second priority.

7. The network device of claim 6, wherein the first priority is based on cumulative weights of each criterion met by at least one property of the first application and the second priority is based on cumulative weights of each criterion met by at least one property of the second application.

8. The network device of claim 1, wherein to apply AMR for the first application, the AMR module is configured to:
transmit a copy of a packet associated with the first application via each of two or more WAN links.

9. The network device of claim 1, wherein the AMR module is further configured to:
compare the criteria to at least one property of a second application of the plurality of applications;
identify, based on at least one property of the second application not meeting any of the criterion of the criteria, the second application as not eligible for AMR;
determine a breach of one of the SLAs on each WAN link associated with the second application; and
refrain from applying, in response to determining the breach of one of the SLAs on each WAN link associated with the second application, AMR for the second application.

10. A method comprising:
comparing, by processing circuitry, criteria to at least one property of at least one of a plurality of applications to determine whether any criterion of the criteria is met by the at least one property, the plurality of applications not being pre-provisioned for application-based multipath routing (AMR);
identifying, by the processing circuitry and based on the at least one property of the at least one of the plurality of applications meeting any criterion of the criteria, one or more of the plurality of applications as eligible for AMR in a software-defined wide area network (SD-WAN);
determining, by the processing circuitry, a breach of a service level agreement (SLA) for a first application of the identified one or more of the plurality of applications on each WAN link associated with the first application; and
applying, by the processing circuitry and in response to determining the breach, AMR for the first application.

11. The method of claim 10, wherein the criteria are predetermined and comprise at least one of real-time transport protocol (RTP), office-related, size, banking, trading, or differentiated services code point (DSCP) marking.

12. The method of claim 10, further comprising:
autonomously modifying, by the processing circuitry, the criteria.

13. The method of claim 10, wherein each criterion of the criteria has an associated weighting and wherein the method further comprises:
autonomously modifying, by the processing circuitry, one or more weightings associated with the criteria.

14. The method of claim 10, further comprising:
determining, by the processing circuitry, that available resources of a network device are sufficient to support AMR for the first application,
wherein the applying AMR to the first application is further based on the available resources being sufficient to support AMR for the first application.

15. The method of claim 10, wherein the one or more applications comprise a second application, wherein each criterion of the criteria has an associated weighting, and wherein the method further comprises:
determining, based on the criteria, a first priority for the first application and a second priority for the second application, the first priority being higher than the second priority;
determining, by the processing circuitry, a breach of one of the one or more SLAs on each WAN link associated with the second application;
determining, by the processing circuitry, that available resources are not sufficient to support AMR for both the first application and the second application; and
applying, by the processing circuitry, AMR for the first application and refraining from applying AMR for the second application based on the first priority being higher than the second priority.

16. The method of claim 15, wherein the first priority is based on cumulative weights of each criterion having a corresponding property to the first application and the second priority is based on cumulative weights of each criterion having a corresponding property to the second application.

17. The method of claim 10, wherein the method is performed by an SD-WAN edge device.

18. The method of claim 10, wherein the identifying one or more applications for AMR and the determining the breach of an SLA are performed by an SD-WAN controller, and wherein the SD-WAN controller outputs configuration data to cause an SD-WAN edge device to apply AMR for the first application.

19. The method of claim 10, further comprising:
comparing, by the processing circuitry, the criteria to at least one property of a second application of the plurality of applications;
identifying, by the processing circuitry and based on at least one property of the second application not meeting any of the criterion of the criteria, the second application as not eligible for AMR;
determining, by the processing circuitry, a breach of one of the SLAs on each WAN link associated with the second application; and
refraining from applying, by the processing circuitry and in response to determining the breach of one of the SLAs on each WAN link associated with the second application, AMR for the second application.

20. A non-transitory computer-readable storage medium storing instructions, which, when executed, cause processing circuitry to:
compare criteria to at least one property of at least one of a plurality of applications to determine whether any criterion of the criteria is met by the at least one property, the plurality of applications not being pre-provisioned for application-based multipath routing (AMR);
identify, based on the at least one property of the at least one of the plurality of applications meeting any criterion of the criteria, one or more of the plurality of applications as eligible for AMR in a software-defined wide area network (SD-WAN);

determine a breach of a service level agreement (SLA) for a first application of the identified one or more of the plurality of applications on each WAN link associated with the first application; and apply, in response to determining the breach, AMR for the first application.

* * * * *